United States Patent Office 3,504,037
Patented Mar. 31, 1970

3,504,037
ADDUCTS OF FLUORO-KETONES
Julianne H. Prager, Arden Hills Village, Minn., assignor to Minnesota Mining and Manufacturing Company, St. Paul, Minn., a corporation of Delaware
No Drawing. Continuation of application Ser. No. 520,853, Jan. 17, 1966. This application Nov. 16, 1967, Ser. No. 683,471
Int. Cl. C07c *49/04*
U.S. Cl. 260—593
9 Claims

ABSTRACT OF THE DISCLOSURE

Adducts of highly fluorinated ketones and metal hydroxides are formed by treating the ketone with a dilute aqueous solution of the base, or with solid base. The resulting adducts are stable and the lower members of the series have herbicidal properties.

CROSS REFERENCE

This application is a continuation of prior copending application Ser. No. 520,853, filed Jan. 17, 1966.

BACKGROUND OF THE INVENTION

Field of the invention

This invention relates to a new class of fluorine-containing organic compounds, and more particularly to a new class of metal hydroxide-fluorinated ketone adducts and a process for their preparation.

Description of the prior art

Reactions of ketones with solutions of alkali metal hydroxides have heretofore been studied by many investigators, but in no cases were stable adducts obtained. Thus hydrocarbon ketones containing at least one hydrogen atom on a carbon adjacent to the carbonyl group have been shown to undergo self addition reactions in the presence of dilute alkali metal hydroxide solutions. In this way, although the equilibrium is toward the ketone, acetone is known to form diacetone alcohol in the presence of base.

Ketones containing a trichloro, tribromo, or triodo group adjacent to the carbonyl group undergo cleavage reactions in the presence of alkali metal hydroxides, with formation of a haloform from the halogen-substituted portion and an acid salt from the remainder. It is similarly known that sodium hydroxide cleaves trichloroacetone to form chloroform and sodium acetate. In the well-known haloform reaction, a compound containing an alphamethyl ketone group is treated with a hypohalite solution, e.g. with sodium hypochlorite, whereupon halogenation of the methyl group to the trihalomethyl group occurs, followed by base-induced cleavage.

Fluorine-containing ketones have been reported to undergo a somewhat similar reaction. The reaction of monochloropentafluoroacetone and hexafluoroacetone upon prolonged heating with aqueous alkali metal hydroxides has been reported to yield alkali metal trifluoroacetate.

SUMMARY OF THE INVENTION

It is an object of the present invention to provide certain adducts of metal hydroxides with fluorinated ketones. A further aspect of the invention is the process for producing such adducts.

The present invention provides a novel class of fluorine-containing organic compounds, namely, metal hydroxide adducts of fluorinated ketones, having the following general formula

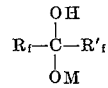

wherein $R_f$ and $R'_f$ are highly fluorinated alkyl radicals, the sum of the carbon atoms contained therein being from 2 to 20, each of the radicals having only halogen substituents on the carbon atom adjacent to the hydroxyl-substituted carbon atom, and M is a metal of Groups I and II of the Periodic Table. $R_f$ and $R'_f$ can be the same or different radicals.

The compounds of the invention are colorless salts which are soluble in water and in hydroxylated and oxygen-containing organic solvents. They are stable and detectable in solution. Some of them can be isolated in pure condition as white, crystalline solids. When treated with acid, e.g. sulfuric acid, the ketones are regenerated.

The metal hydroxide-fluorinated ketone adducts are highly useful. Some of them can be employed as welding fluxes. They have the property of lowering the surface tension of water, and can be used as surface active agents. Especially useful for this purpose are the higher members in which the polar

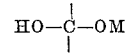

group is combined with a fluorocarbon moiety having several carbon atoms. The lower members possess useful herbicidal properties and are especially useful for defoliating cotton.

The metal hydroxide-fluorinated ketone adducts are also especially suitable as intermediate compounds in the preparation of other useful products. Thus, by reaction with diazomethane, acetals are produced.

The adducts of the invention can be prepared by treating the ketone or the ketone hydrate, or an aqueous solution of the ketone, with a dilute aqueous solution of the selected metal hydroxide in substantially stoichiometric amount. In the case of the higher molecular weight fluorinated ketones, it is often desirable to provide a liquid medium, such as ether or dioxane, for the reaction.

It is preferable to carry out the process under rather mild conditions in order to avoid cleavage reactions. Thus, the reaction is usefully carried out at a temperature near room temperature, and it is desirable to use a rather dilute solution of the metal hydroxide. In this way the desired product is easily obtained in pure form. Highly concentrated solutions of metal hydroxides can be employed in the process, but may result in a certain amount of cleavage. Depending on the solubility of the selected compound, concentrations in the range of about 1 to 5 percent are preferred.

It is preferable to add the metal hydroxide solution to the ketone or ketone hydrate, rather than to use the reverse process, to avoid undesirable local concentrations of the metal hydroxide. Stirring of the reaction mixture is likewise also advantageous.

For bettter control, it is convenient to follow the reaction with a pH meter. The ketone hydrate is slightly acidic; the sodium hydroxide adduct is slightly alkaline. As the equivalence point is approached, the rate of change of pH with volume of hydroxide added becomes more rapid. The best yield of product is obtained if only the stoichiometric amount of base is added and the addition is stopped at the equivalence point.

Suitable solvents for the process include water, hydrocarbon ketones and the like. Thus, acetone, dioxane, methyl ethyl ketone, etc. can be employed. It is preferred to employ a temperature of the order of 15° to 40° C.

The reaction mixture is conveniently worked up by evaporating off the water and any other solvent, at atmospheric or reduced pressure. The residual solid constitutes the metal hydroxide adduct to the fluorinated ketone. In general, it is in a good state of purity if an excess of metal hydroxide has been avoided. Further purification can be accomplished by recrystallizing the residual solid from an appropriate solvent, such as ethyl ether, dioxane, diglym and tetrahydrofuran. For example, ethyl ether can be used in the case of the sodium hydroxide-hexafluoroacetone adduct.

A variety of highly fluorinated ketones can be used in this invention. Generally speaking, these contain alkyl radicals substituted with fluorine atoms in place of hydrogen; however, the alkyl radicals may be substituted with chlorine in the proportion of up to one chlorine atom to two fluorine atoms, and hydrogen can be present in the proportion of up to one hydrogen to six halogen atoms, except that in all cases the carbon atom adjacent to the carbonyl group must be fully halogenated.

Examples include perfluorinated ketones, such as hexafluoroacetone, perfluoro-2-butanone, perfluorocyclopentanone, perfluoro-2-pentanone, perfluoro-3-hexanone, perfluoro-4-heptanone and the like, or mixed halogen ketones such as chloropentafluoroacetone, dichlorotetrafluoroacetone and the like.

In the preferred embodiment of the process, a fully-fluorinated ketone is used. However, the process is also operable if certain other substituents are present at positions remote from the carbon atoms attached to the carbonyl group. The presence of certain proportions of hydrogen and chlorine atoms has been described; ether groups, carboxylic acid moieties, aromatic rings, etc. can be present. When there are other acidic groups present, additional metal hydroxide is used to provide an amount equivalent to the carboxyl or other group.

Alternately to the preparation of the metal salts of the invention by treating the solution of ketone with aqueous metal oxide solution, it is possible to make the salts of the invention by passing the ketone or a solution of the ketone over the metal oxide in finely divided form.

Metal hydroxides which are satisfactory for the embodiment of this invention include all hydroxides of the metals derived from Groups I and II of the Periodic Table. Examples of such metals are sodium, potassium, lithium, cesium, strontium, magnesium, calcium, barium, silver, zinc, copper, cadmium and mercury.

The following examples, in which all parts are by weight unless otherwise specified, are intended to illustrate the present invention, but no limitations to the scope of the invention are implied.

EXAMPLE 1

Hexafluoroacetone hydrate is prepared by the aqueous permanganate oxidation of perfluoroisobutylene according to the Morse et al. modification (Can. J. Chem., 33, 453 (1955)) of the procedure of Brice et al. (J. Am. Chem. Soc. 75, 2698 (1953). The product of reaction from one run, B.P. 55°–56° C. at 80 mm. Hg, contained 78.2 percent hexafluoroacetone hydrate, 18.5 percent diethyl ether and 3.3 percent water. To 12.8 g. of the 78 percent solution (.054 mole) are added 2.16 g. (.054 mole) of sodium hydroxide dissolved in 10 cc. of water. After the addition is complete, the solution is evaporated to dryness under reduced pressure at 50° C. The white, crystalline solid thus obtained is the hexafluoroacetone-sodium hydroxide adduct.

*Analysis.*—Calculated for $C_3F_6HO_2Na$ (percent): C, 17.5; Na, 11.2. Found (percent): C, 18.0; Na, 11.2.

The infrared spectrum of this material is consistent with the structure.

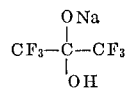

Absorptions at 4.1 microns and 5.4 microns appear to be due to a strongly associated OH structure. A small carbonyl adsorption is due to sodium trifluoroacetate impurity.

Example 2

To 6.9 g. (.038 mole) of hexafluoroacetone hydrate (prepared from commercially available hexafluoroacetone and one equivalent of water) is added with stirring enough one normal sodium hydroxide solution to bring the pH to 8.8. The amount required (38 ml.) is essentially the calculated stoichiometric equivalent. This solution is evaporated to dryness in air at room temperature and then under vacuum at room temperature. The infrared spectrum of the white, crystalline product shows it to be hexafluoroacetone hydrate-sodium hydroxide adduct of high purity. The infrared spectrum shows practically no carbonyl-type absorption. Further indications of the purity are found in the complete solubility of the product in diethyl ether. Sodium trifluoroacetate is insoluble in ether.

EXAMPLE 3

To a solution in 50 ml. of dioxane of 9.6 g. (.025 mole) of 4-perfluoroheptanone hydrate (prepared by the method of Hauptschein et al., J. Am. Chem. Soc., 77, 4930 ff.) is added with stirring 25 ml. of a one normal solution of potassium hydroxide in water. The 4-perfluoroheptanone-potassium hydroxide adduct is used directly in solution as prepared; potentiometric titration shows that the reaction is essentially quantitative.

Similarly, by adding 50 ml. of a one normal solution of sodium hydroxide in water to a solution of 18.3 g. (0.05 mole) of 2-perfluoroheptanone in 50 ml. of dioxane, the 2-perfluoroheptanone-sodium hydroxide adduct is obtained. This can be used, in concentration of 0.1 to 1 percent, as a surface tension depressant for water.

EXAMPLE 4

The procedure of Example 2 is followed, using 1-chloropentafluoroacetone hydrate and lithium hydroxide as reactants. The lithium hydroxide adduct of 1-chloro-pentafluoroacetone is recovered as a white solid. Similarly, using 1,3-dichloro-tetrafluoroacetone in this procedure yields the lithium hydroxide adduct as a white solid.

EXAMPLE 5

To 6.9 g. (0.38 mole) of hexafluoroacetone hydrate is added a slurry of 11.10 g. of magnesium hydroxide in 100 ml. of water. The mixture is stirred for about one hour at 30° C., whereupon the mixture has become clear. The reaction mixture is filtered and the water is removed by evaporating under reduced pressure at 30° C. A white solid consisting of the magnesium hydroxide adduct of hexafluoroacetone is recovered.

What is claimed is:

1. A process for the production of fluorinated ketone-metal hydroxide adducts, which comprises bringing together in aqueous solution and in essentially stoichiometric proportions a hydrate of a fluorinated ketone in which the carbon atoms attached to the carbonyl group thereof are free from substituents other than fluorine, and a hydroxide of a Group I or II metal, at a temperature in the range of 5° to 40° C.

2. A process according to claim 1, in which the ketone is hexafluoroacetone.

3. A process according to claim 1, in which the metal hydroxide and the aqueous ketone solution are admixed in a manner which effectively avoids excessive local concentrations of metal hydroxide in the reaction mixture.

4. A process according to claim 1, in which the metal hydroxide is an alkali metal hydroxide.

5. A process according to claim 1, in which the ketone is chloropentafluoroacetone and the metal hydroxide is lithium hydroxide.

6. A process according to claim 1, in which the ketone is dichlorotetrafluoroacetone and the metal hydroxide is lithium hydroxide.

7. A process according to claim 1, in which the metal hydroxide is an alkaline earth metal hydroxide.

8. A process according to claim 1, in which the metal hydroxide is lithium hydroxide.

9. A process according to claim 1, in which the ketone is hexafluoroacetone and the metal hydroxide is sodium hydroxide.

References Cited

UNITED STATES PATENTS

| | | |
|---|---|---|
| 3,094,370 | 6/1963 | Nicoll. |
| 3,091,643 | 5/1963 | Wiley. |
| 2,827,485 | 3/1958 | Miller. |
| 2,802,034 | 8/1957 | Hauptschein. |

BERNARD HELFIN, Primary Examiner

W. B. LONE, Assistant Examiner

U.S. Cl. X.R.

71—70; 252—352; 260—615, 633